United States Patent
Cave et al.

(10) Patent No.: US 7,450,904 B2
(45) Date of Patent: Nov. 11, 2008

(54) ESCAPE MECHANISM FOR A WIRELESS LOCAL AREA NETWORK

(75) Inventors: Christopher Cave, Candiac (CA); Paul Marinier, Brossard (CA); Angelo Cuffaro, Laval (CA)

(73) Assignee: Interdigital Technology Corporation, Wilmington, DE (US)

( * ) Notice: Subject to any disclaimer, the term of this patent is extended or adjusted under 35 U.S.C. 154(b) by 87 days.

(21) Appl. No.: 10/942,576

(22) Filed: Sep. 16, 2004

(65) Prior Publication Data

US 2005/0153667 A1   Jul. 14, 2005

Related U.S. Application Data

(60) Provisional application No. 60/535,429, filed on Jan. 8, 2004.

(51) Int. Cl.
    *H04B 15/00* (2006.01)
(52) U.S. Cl. ................... 455/62; 455/63.1; 455/39; 455/450; 455/561
(58) Field of Classification Search ........... 455/62, 455/63.1, 39, 450, 561; 379/59; 370/329, 370/341
    See application file for complete search history.

(56) References Cited

U.S. PATENT DOCUMENTS 5,475,864 A * 12/1995 Hamabe .......... 455/452.2
5,963,848 A    10/1999 D'Avello
2002/0181417 A1 12/2002 Malhotra et al.
2003/0063592 A1 4/2003 Seki et al.
2004/0156336 A1* 8/2004 McFarland et al. ........ 370/329
2006/0029023 A1* 2/2006 Cervello et al. .......... 370/333

FOREIGN PATENT DOCUMENTS

JP   15-037607   2/2003
KR   2003-26817  4/2003

OTHER PUBLICATIONS

Choi et al., "Transmitter Power Control (TPC) and Dynamic Frequency Selection (DFS) Joint Proposal for 802.11h WLAN," IEEE 802.11-01/169, pp. 1-16, (Mar. 12, 2001).

* cited by examiner

*Primary Examiner*—Rafael Perez-Gutierrez
*Assistant Examiner*—Khai Nguyen
(74) *Attorney, Agent, or Firm*—Volpe And Koenig, P.C.

(57) ABSTRACT

A method for changing a channel in a wireless local area network (WLAN) to alleviate congestion and high interference levels, the WLAN having an access point (AP) and at least one station, begins by determining a list of candidate channels. A channel is selected from the candidate list and is evaluated against predetermined criteria. If the selected channel meets the predetermined criteria, then all of the stations communicating with the AP are disassociated and the AP is changed to the selected channel. If the selected channel does not meet the predetermined criteria, then the selected channel is removed from the candidate list and the selecting step is repeated if there are additional candidate channels.

27 Claims, 2 Drawing Sheets

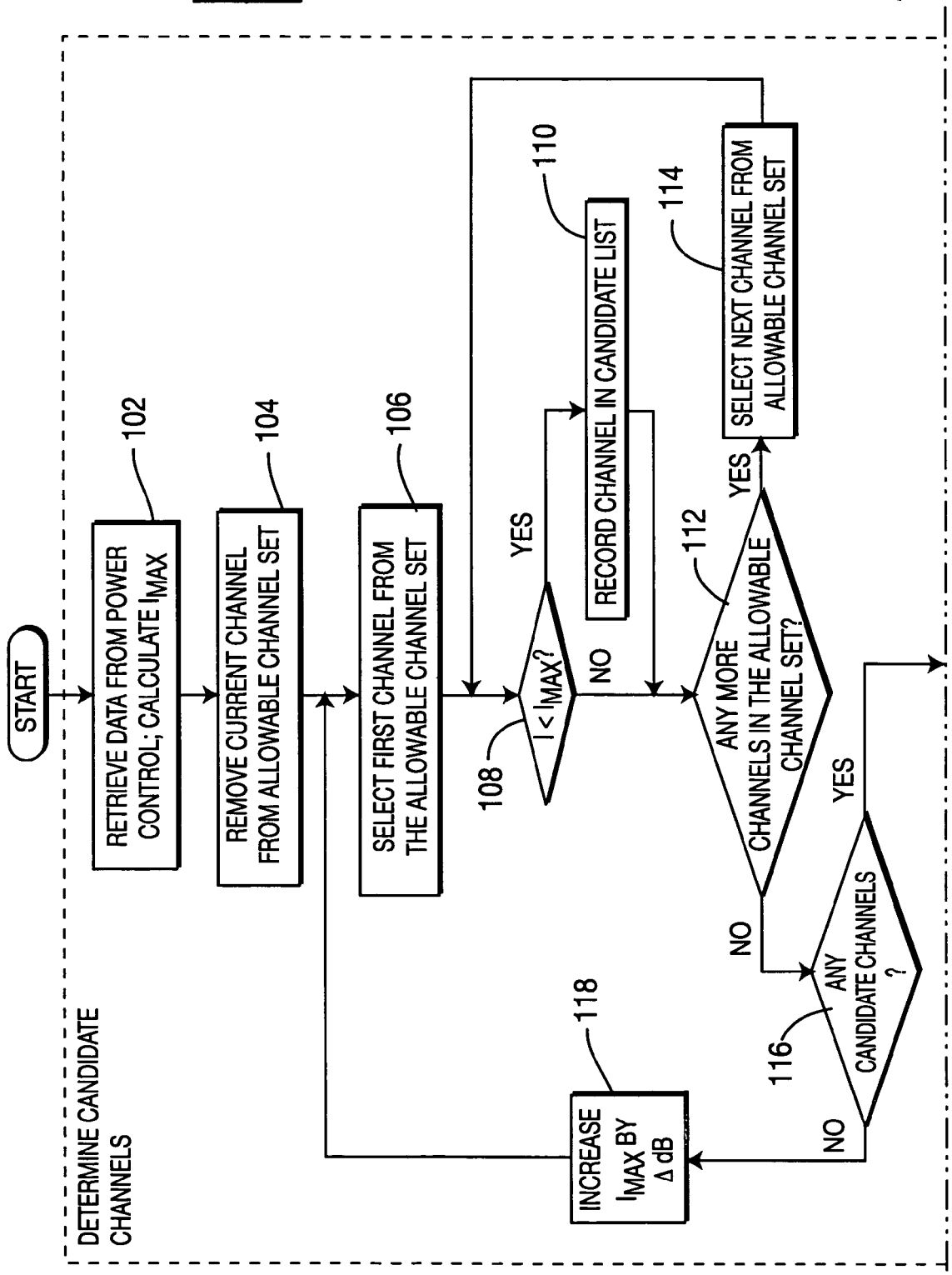

ESCAPE MECHANISM FOR A WIRELESS LOCAL AREA NETWORK

CROSS REFERENCE TO RELATED APPLICATIONS

This application claims the benefit of U.S. Provisional Application No. 60/535,429, filed Jan. 8, 2004, which is incorporated by reference as if fully set forth herein.

FIELD OF INVENTION

The present invention relates to wireless local area networks (WLANs) and, more particularly, to a method for alleviating congestion and interference levels in a WLAN by changing the channel currently in use.

BACKGROUND

A frequency selection algorithm is used to automatically select the most appropriate operating frequency for an access point (AP) in a WLAN. Frequency selection (FS) is typically composed of three distinct processes: initial FS, optimization FS, and escape FS. The initial FS process determines the best operating channel upon AP startup. The optimization FS process dynamically determines the optimal operating channel during system operation, without service disruption to associated wireless terminals (stations) in the basic service set (BSS). The process waits until there is no activity in the BSS for a certain period of time before changing the operating channel to a less loaded one.

The escape FS process is used to alleviate extreme congestion situations or intolerable interference levels. The escape FS process will only be invoked if the service degradation due to congestion or interference is worse than the harm resulting from service disruption to all associated stations, because all associated stations must first be disassociated from the AP prior to escaping to a different channel. The present invention relates to the escape FS process.

SUMMARY

A method for changing a channel in a wireless local area network (WLAN) to alleviate congestion and high interference levels, the WLAN having an access point (AP) and at least one station, begins by determining a list of candidate channels. A channel is selected from the candidate list and is evaluated against predetermined criteria. If the selected channel meets the predetermined criteria, then all of the stations communicating with the AP are disassociated and the AP is changed to the selected channel. If the selected channel does not meet the predetermined criteria, then the selected channel is removed from the candidate list and the selecting step is repeated if there are additional candidate channels.

An access point (AP) for changing a channel in a WLAN to alleviate congestion and high interference levels, the WLAN having at least one station, the AP including determining means for determining a list of candidate channels; selecting means for selecting a channel from the candidate list; evaluating means for evaluating the selected channel against predetermined criteria; disassociating means for disassociating all of the stations communicating with the AP if the selected channel meets the predetermined criteria; changing means for changing the AP to the selected channel if the selected channel meets the predetermined criteria; and removing means for removing the selected channel from the candidate list if the selected channel does not meet the predetermined criteria.

An integrated circuit for changing a channel in a WLAN to alleviate congestion and high interference levels, the WLAN having an access point (AP) and at least one station, the integrated circuit including determining means for determining a list of candidate channels; selecting means for selecting a channel from the candidate list; evaluating means for evaluating the selected channel against predetermined criteria; disassociating means for disassociating all of the stations communicating with the AP if the selected channel meets the predetermined criteria; changing means for changing the AP to the selected channel if the selected channel meets the predetermined criteria; and removing means for removing the selected channel from the candidate list if the selected channel does not meet the predetermined criteria.

BRIEF DESCRIPTION OF THE DRAWINGS

A more detailed understanding of the invention may be had from the following description of a preferred embodiment, given by way of example, and to be understood in conjunction with the accompanying drawings wherein:

FIGS. 1A and 1B show a flowchart of a method for an escape FS process in accordance with the present invention.

DETAILED DESCRIPTION OF THE PREFERRED EMBODIMENTS

Figure 1B:
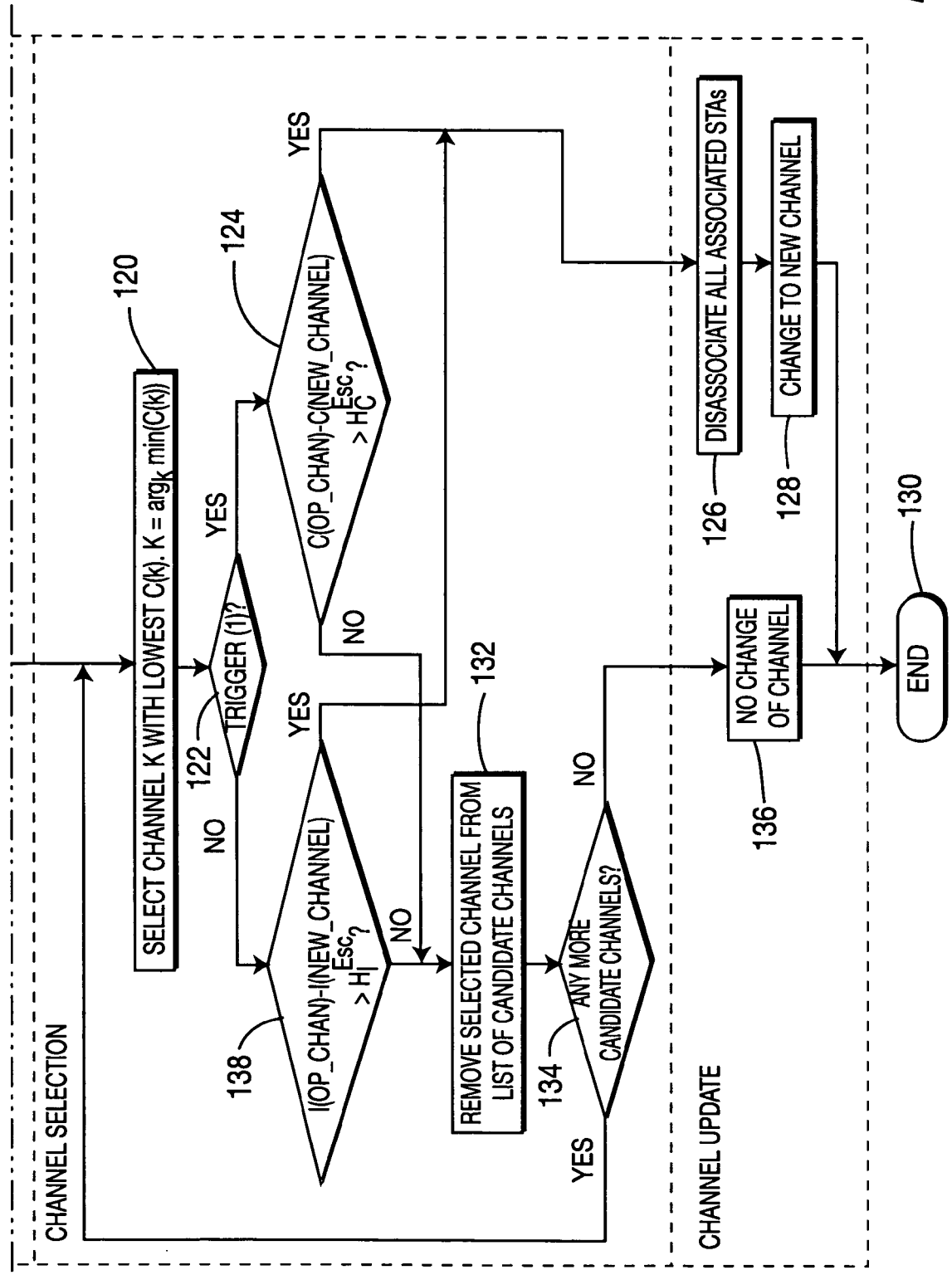

The inputs and parameters used by an escape FS process in accordance with the present invention are listed in Table 1.

TABLE 1

Inputs and parameters of the escape FS process

| Symbol | Description | Type | Default Value |
|---|---|---|---|
| ACS | Allowable channel set. | Configuration parameter | {1, 6, 11} |
| op_chan | Index of the current operating channel within the ACS. | Internal parameter | NA |
| $T_{Last}$ | The minimum elapsed time since the last invocation of any of the FS algorithms for triggering escape FS. | Configuration parameter | 300 seconds |
| $BO_{MIN}$ | The lower bound on the random persistence timer for triggering escape FS. | Configuration parameter | 10 seconds |
| $BO_{MAX}$ | The upper bound on the random persistence timer for triggering escape FS. | Configuration parameter | 100 seconds |

TABLE 1-continued

Inputs and parameters of the escape FS process

| Symbol | Description | Type | Default Value |
|---|---|---|---|
| $DR_{MAX}$ | Deferral Rate triggering threshold. | Configuration parameter | 30% |
| $PER_{MAX}$ | Transmitted packet error rate triggering threshold. | Configuration parameter | 6% |
| $CU_{MAX}$ | Out-of-BSS channel utilization triggering threshold. | Configuration parameter | 40% |
| DR | Deferral rate. This is a measurement that represents the percentage of time that the AP is carrier locked (i.e., is not receiving any packets) and has at least one packet to transmit. The DR measurement is calculated as the total amount of time that the AP deferred transmission over the last $T_{MEAS}$ seconds, divided by $T_{MEAS}$ seconds. DR is calculated every $T_{MEAS}$ seconds. | Measurement | NA |
| PER | Transmitted Packet Error Rate. This measurement is a ratio of the number of transmission failures (i.e., transmitted packets for which an ACK is not received) to the total number of transmitted packets including retransmissions, calculated over $T_{MEAS}$ seconds. PER is calculated every $T_{MEAS}$ seconds. | Measurement | NA |
| C(k) | The average channel utilization of channel k. C(k) is a moving average of the latest channel utilization measurement on each channel. The channel utilization measurement corresponds to the percentage of time that the receiver is carrier locked. The channel utilization estimates can be obtained by intermittently listening to these frequency channels for short periods of time (referred to as Silent Measurement Periods (SMP)), so that normal communications associated with the AP are not substantially disrupted. C(k) consists of an average over $N_{SMP}$ SMP measurements. | Measurement | NA |
| I[ ] | The set of external interference measurements recorded during a given measurement period of $T_{MEAS}$. The external interference measurement consists of the received signal power in the absence of "carrier lock" by the receiver. All external interference measurements that are provided by the chipset are recorded during a given measurement period. | Measurement | NA |
| $I_{SMP}(k)$ | The average external interference level measured on the channel k. $I_{SMP}(k)$ is measured as the average received signal power in the absence of "carrier lock" by the receiver (i.e., the receiver is not receiving any packets). $I_{SMP}(k)$ consists of an average over $N_{SMP}$ SMP measurements. | Measurement | NA |
| L | L represents the own-BSS load, observed over a measurement period of $T_{MEAS}$ seconds. The own-BSS load consists of the sum of the medium usage time of successfully transmitted packets and successfully received packets from associated stations (own-BSS). L is calculated every $T_{MEAS}$ seconds. | Measurement | NA |
| $T_{MEAS}$ | Measurement period over which DR and PER measurements are calculated. | Configuration parameter | 1 second |
| $N_{SMP}$ | Number of SMPs over which C(k) is averaged. | Configuration parameter | 5 |

TABLE 1-continued

Inputs and parameters of the escape FS process

| Symbol | Description | Type | Default Value |
|---|---|---|---|
| $RNG_{base}$ | Baseline Range (set by the Path Loss Discovery process). | Internal parameter | NA |
| $RNG_{adj}$ | Range Adjustment (set by the Load Balancing process). | Internal parameter | NA |
| $(C/I)_{req\_high}$ | Minimum required carrier power to interference ratio to support the planned data rate at the coverage bound. | Configuration parameter | 10 dB |
| $P_{MAX}$ | Maximum AP transmission power. | Configuration parameter | 20 dBm |
| $I_{MAX}$ | The maximum allowed interference on any given channel determined based on baseline range. | Internal parameter | NA |
| $M_I$ | Interference margin used in the calculation of the maximum allowable interference level, $I_{MAX}$. | Configuration parameter | 3 dB |
| $M_L$ | Load margin used in the interference trigger of the algorithm. | Configuration parameter | 1.0 |
| $\Delta$ | The amount, in dB, by which the maximum allowed interference, $I_{MAX}$, is increased if there are no candidate channels for which $I < I_{MAX}$. | Configuration parameter | 3 dB |
| $H_C^{Esc}$ | Hysteresis criterion for channel utilization. The difference between the channel utilization of the current channel and the new channel must exceed this threshold. | Configuration parameter | 10% |
| $H_I^{Esc}$ | Hysteresis criterion for measured interference level. The difference between the interference on the current channel and the new channel must exceed this threshold. | Configuration parameter | 3 dB |
| $N_{RTx}$ | Number of retransmissions of the Disassociate message to a particular station before abandoning. | Configuration parameter | 1 |

The transmit packet error rate, PER, is calculated over all medium access control (MAC) protocol data units (MPDUs) containing data, i.e., all fragments in the case of fragmentation, and all retransmissions. Moreover, a request to send (RTS) message for which a clear to send (CTS) message is not received should be included in the calculation of the transmitted packet error rate. In the event that zero packets were transmitted during the $T_{MEAS}$ measurement period, the PER is set to zero.

Triggering (Start Stage)

The escape FS process is executed only during excessively high congestion situations or when interference is intolerable. Either one of the following triggering criteria, evaluated every $T_{MEAS}$ seconds, must be satisfied to invoke the escape FS process.

The first triggering criterion is a channel congestion criterion, in which the following three conditions are satisfied:

1) $C(op\_chan) > CU_{MAX}$;
2) $DR > DR_{MAX}$; and
3) $PER > PER_{MAX}$.

The out-off-BSS channel utilization measurement, the AP deferral rate, and the transmitted packet error rate must exceed their respective triggering thresholds. It is noted that the out-of-BSS channel utilization measurements can be obtained by intermittently listening to the different frequency channels for short periods of time, i.e., Silent Measurement Periods (SMP), so that normal communications associated with the AP are not substantially disrupted.

These three metrics were carefully chosen to ensure that the escape FS algorithm only triggers when a change of channel is required and beneficial. First, the out-of-BSS channel utilization metric is used to ensure that the channel congestion is caused, at least in part, by out-of-BSS WLAN traffic. If the congestion were caused only by in-BSS traffic, a change of channel would not alleviate the congestion situation because all of the traffic would be moved to the new channel. Second, the deferral rate measurement is considered to ensure that the AP effectively perceives the congestion; a high deferral rate indicates that the AP has a significant amount of data to transmit and is experiencing significant delays for channel access. Third, the packet error rate must exceed its triggering threshold.

The second triggering criterion corresponds to an intolerable interference level. Many external interference sources, such as a microwave oven, exhibit intermittent interference patterns. As a result, the effect of the interference source depends on the proportion of time that the intolerable interference persists, as well as the traffic load of the AP.

Let PI represent the proportion of time that the external interference level is intolerable over a given measurement period:

$$PI = \frac{Size(I[] > I_{MAX})}{Size(I[])} \qquad \text{Equation (1)}$$

where the determination of $I_{MAX}$ is described later.

The following triggering criterion is defined:

$$(1 - CU(op\_chan)) \times (1 - PI) \leq (L \times M_L) \qquad \text{Equation (2)}$$

The left-hand side of Equation (2), (1−CU(op_chan))×(1−PI), effectively represents the "good bandwidth" that is available for own-BSS transmission, whereas the right-hand side represents the BSS load. The escape FS algorithm will only trigger if the intolerable interference occupies so much bandwidth that there is not enough interference-free bandwidth for the AP to serve its load.

Along with the triggering criteria described above, at least $T_{Last}$ seconds must have elapsed since the last execution of either initial FS, optimization FS, or escape FS; otherwise, the triggering condition is ignored. The value of $T_{Last}$ is the same as for the optimization FS algorithm. Once $T_{Last}$ has expired since a channel change, the two triggering conditions are evaluated periodically over $T_{MEAS}$.

Moreover, the triggering criteria must persist for at least $T_{Trigger}$ seconds in order to allow a frequency change. The duration of the required persistence time, $T_{Trigger}$, is generated as a random variable that is uniformly distributed between $BO_{MIN}$ and $BO_{MAX}$, in discrete steps of $T_{MEAS}$. The use of a random timer results in a back-off procedure, which ensures that two competing BSSs on the same channel do not escape at the same time.

Both triggering criteria, along with $BO_{MIN}$, should be carefully set to avoid premature channel changes. The escape FS process is considered as a last resort, because all associated stations must first be disassociated prior to changing the channel, resulting in an interruption of service. The channel should only be changed if the current external loading and/or external interference are unsupportable, in which case it is worth interrupting service to all stations. Finally, $BO_{MAX}$ should be set high enough to yield a small probability of having multiple APs simultaneously escaping, and low enough to ensure a quick response by the escape FS process.

A flowchart of the escape FS process 100 is illustrated in FIGS. 1A and 1B. The escape FS process 100 can be performed by an AP. The components of the AP performing the escape FS process 100 can be an integrated circuit (IC), such as an application specific IC (ASIC), multiple ICs, discrete components, or a combination of discrete components and IC(s). Upon triggering the escape FS process, a set of candidate channels is first determined, followed by channel selection and channel update (if required).

Determining Candidate Channels

The set of candidate channels does not consist of the all channels in the allowable channel set (ACS). Only channels for which the interference measurement, I, lies below the maximum allowed interference level, $I_{MAX}$, are considered; those with interference levels above $I_{MAX}$ are ignored. The escape FS process 100 begins by retrieving data from power control and then calculating the value $I_{MAX}$ (step 102). The initial maximum allowed interference level is calculated as:

$$I_{MAX} = P_{MAX} - (RNG_{base} + RNG_{adj}) - (C/I)_{req\_high} - M_I \qquad \text{Equation (3)}$$

where $(RNG_{base} + RNG_{adj})$ represents the range covered by the AP and $(C/I)_{req\_high}$ is set to the required carrier power to interference ratio of a packet at the planned rate at BSS range (i.e., 5.5 or 11 Mbps). A margin, $M_I$, is subtracted to eliminate channels with interference levels too close to the actual maximum allowed level.

The current channel is removed from the ACS (step 104), because the process is looking to escape from the current channel. The first channel from the ACS is selected (step 106). The interference measured on the selected channel is compared to the maximum allowed interference (step 108). If the interference on the current channel is less than the maximum interference, then the current channel is recorded in the candidate channel list (step 110).

If the interference on the current channel exceeds the maximum interference (step 108) or if the channel is recorded in the candidate list (step 110), a determination is then made whether there are more channels in the ACS (step 112). If there are more channels in the ACS, then the next channel is selected (step 114) and is evaluated at step 108 as described above.

If there are no more channels in the ACS (step 112), a determination is made whether there are any channels in the candidate list (step 116). If there are no channels in the candidate list, i.e., $I(k) > I_{MAX}$ for all k, then the value of $I_{MAX}$ is increased by a predetermined amount (Δ dB; step 118), and a new list of candidate channels is generated by re-running the process starting at step 106. The process is continued until a candidate list containing at least one channel is found. Δ should be set such that all channels with similar interference levels are considered as candidates; any value for Δ greater than zero is acceptable.

If there are channels in the candidate list (step 116), then the process continues with the channel selection and channel update stages.

Channel Selection and Channel Update

From the candidate list, the channel with the lowest average channel utilization C(k) is selected (step 120). Channel selection amongst candidate channels is primarily based on recent channel utilization measurements. The channel utilization of channel k, C(k), is an average of the latest channel utilization measurements on each channel. Channel utilization measurements are performed during the silent measurement periods (SMPs) and correspond to the percentage of time that the receiver is carrier locked. Since channel utilization is observed during SMPs, all packets that cause the AP to carrier lock originate from neighboring BSSs. The channel utilization measurement represents the out-of-BSS channel usage.

A decision is made to determine which of the trigger criteria was met to activate the process 100 (step 122). If the trigger was (1; channel congestion), then a determination is made whether the channel utilization of the selected channel is lower than the channel utilization of the current channel by a predetermined amount (step 124). Based on the triggering criterion, a hysteresis criterion is verified. For trigger (1), the hysteresis criterion is defined as:

$$C(\text{op\_chan}) - C(\text{new\_channel}) > H_C^{Esc} \qquad \text{Equation (4)}$$

The channel utilization of the new channel must be lower than the channel utilization of the current channel by at least $H_C^{Esc}$ %. If this condition is met, then the BSS channel is updated with the new channel. All of the stations associated with the AP are disassociated (step 126). The AP first sends a Disassociation message to each associated station, and then changes its frequency to the new frequency. In the case where a Disassociation message is sent to a station and no ACK is received, the AP will retransmit the message up to $N_{RTx}$ times before abandoning the disassociation of this particular station. It is noted that the likelihood of transmission failure of a Disassociation message should be high given the severity of conditions under which the escape FS process is triggered.

The AP changes to the new channel (step 128), and the process terminates (step 130). The disassociated stations will then reassociate with the AP, per known procedures.

If the channel utilization of the selected channel is not lower than the channel utilization of the current channel by a predetermined amount (step 124), then the selected channel is removed from the list of candidate channels (step 132). Next, a determination is made whether there are any more channels in the candidate list (step 134). If there are more candidate channels, then the process continues with step 120 as described above. If there are no more candidate channels (step 134), then no change of channel is made (step 136) and the process terminates (step 130). This process continues until a candidate channel that satisfies the hysteresis criterion is found or there are no remaining candidate channels.

If the escape FS algorithm 100 was activated by trigger (2; intolerable interference) (step 122), then a determination is made whether the interference on the selected channel is lower than the interference on the current channel by a predetermined amount (step 138). For trigger (2), the hysteresis criterion is defined as:

$$I(op\_chan) - I(new\_channel) > H_I^{Es} \qquad \text{Equation (5)}$$

The interference level of the new channel must be lower than the interference level of the current channel by at least $H^{iEsc}$ dB. The hysteresis criterion is used to ensure that change of channel will be beneficial enough to justify the service interruption to associated stations.

If this condition is met, then the process 100 continues with step 126, as described above. If this condition is not met, then the process 100 continues with step 132, as described above.

The following features need to be supported by the AP in order to perform the escape FS process 100:

1) Transmitted packet error rate measurement with configurable averaging window size. Alternatively, the AP can provide an indication for each successful and failed packet transmission.

2) Received packet error rate measurement with configurable averaging window size. Alternatively, the AP can provide an indication for each successful and failed packet reception.

3) The Deferral Rate measurement, which corresponds to the percentage of time that the AP is carrier locked by an out-of-BSS packet and has at least one packet to transmit.

4) Channel utilization during a silent measurement period, which corresponds to the percentage of time that the receiver is carrier locked.

5) External interference measurement, which corresponds to the average received signal power in the absence of carrier lock by the receiver.

6) Number of retransmissions of a particular packet.

7) Dynamic setting/update of the operating channel.

In other embodiments, additional modifications could be made to the present invention to better alleviate congestion and high interference levels in the WLAN. For example, the AP can inform stations of a change of operating frequency to eliminate the need for disassociating them. The optimization FS process can thus run periodically, without any concern for activity on the channel, eliminating the need for a separate escape FS process. Another modification would be to employ a centralized scheme, where channel assignment is determined on a network basis rather than independently for each BSS, which improves overall system performance. Furthermore, inter-AP communication would allow APs to share load information and notification of a change in frequency. In some WLAN settings, such as a MESA setting, the WLAN does not support inter-AP communication.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for changing a channel, the method comprising:

determining a list of candidate channels;

selecting a channel from the candidate list;

evaluating the selected channel against predetermined criteria selected from the group consisting of channel utilization and measured interference level;

if the selected channel meets the predetermined criteria, then disassociating an access point (AP) from all of the stations communicating with the AP; and changing the AP to the selected channel;

if the selected channel does not meet the predetermined criteria, then removing the selected channel from the candidate list; and repeating the selecting of a channel if there are additional candidate channels.

2. The method according to claim 1, further comprising:

reassociating the stations with the AP, the reassociating step being performed after the changing step.

3. The method according to claim 1, wherein the determining includes:

selecting a channel from an allowable channel set (ACS);

measuring an interference level of the selected channel;

comparing the interference level of the selected channel with a maximum interference value; and adding the selected channel to the list of candidate channels if the interference of the selected channel is less than the maximum interference value.

4. The method according to claim 3, wherein the ACS does not include a current channel.

5. The method according to claim 3, wherein if all of the channels in the ACS have been examined and the candidate list is empty, then increasing the maximum interference value by a predetermined amount; and repeating the determining of a list of candidate channels.

6. The method according to claim 1, wherein selecting includes selecting the channel with the lowest average channel utilization.

7. The method according to claim 1, wherein the evaluating includes:

measuring a channel utilization of the selected channel; and comparing the channel utilization of the selected channel with a channel utilization of the current channel;

wherein the selected channel meets the criteria if the channel utilization of the selected channel is less than the channel utilization of the current channel by a predetermined amount.

8. The method according to claim 1, wherein the evaluating includes:

measuring an interference level of the selected channel; and comparing the interference level of the selected channel with an interference level of the current channel;

wherein the selected channel meets the criteria if the interference level of the selected channel is less than the interference level of the current channel by a predetermined amount.

9. The method according to claim 1, further comprising:
receiving an activation trigger prior to the determining.

10. The method according to claim 9, wherein the activation trigger is sent when a channel congestion condition exists.

11. The method according to claim 10, wherein a channel congestion condition exists when
an average channel utilization of the current channel exceeds a maximum channel utilization threshold;
a packet deferral rate exceeds a maximum deferral rate; and
a transmission packet error rate exceeds a maximum packet error rate.

12. The method according to claim 9, wherein the activation trigger is sent when an intolerable interference level exists.

13. The method according to claim 12, wherein an intolerable interference level exists when an external interference level exceeds a maximum interference level for a predetermined period of time.

14. An access point (AP) for changing a channel to alleviate congestion and high interference levels in a wireless local area network having at least one station, the AP comprising:
determining circuitry configured to determine a list of candidate channels;
selecting circuitry configured to select a channel from said candidate list;
evaluating circuitry configured to evaluate said selected channel against predetermined criteria selected from the group consisting of channel utilization and measured interference level;
disassociating circuitry configured to disassociate all of the stations communicating with the AP if said selected channel meets the predetermined criteria;
changing circuitry configured to change the AP to said selected channel if said selected channel meets the predetermined criteria; and
removing circuitry configured to remove said selected channel from said candidate list if said selected channel does not meet the predetermined criteria.

15. The AP according to claim 14, further comprising:
reassociating circuitry configured to reassociate the stations with the AP after the stations have been disassociated from the AP and the channel is changed at the AP.

16. The AP according to claim 14, wherein said determining circuitry includes:
selecting circuitry configured to select a channel from an allowable channel set (ACS);
measuring circuitry configured to measure an interference level of said selected channel;
comparing circuitry configured to compare the interference of said selected channel with a maximum interference value; and
adding circuitry configured to add said selected channel to said list of candidate channels if the interference of said selected channel is less than the maximum interference value.

17. The AP according to claim 16, wherein said ACS does not include the current channel.

18. The AP according to claim 16, wherein if all of the channels in said ACS have been examined and said candidate list is empty, the AP increases the maximum interference value by a predetermined amount.

19. The AP according to claim 14, wherein said selecting circuitry includes selecting the channel with the lowest average channel utilization.

20. The AP according to claim 14, wherein said evaluating circuitry includes:
measuring circuitry configured to measure a channel utilization of said selected channel; and
comparing circuitry configured to compare the channel utilization of said selected channel with a channel utilization of the current channel, whereby said selected channel meets the criteria if the channel utilization of said selected channel is less than the channel utilization of the current channel by a predetermined amount.

21. The AP according to claim 14, wherein said evaluating circuitry includes:
measuring circuitry configured to measure an interference level of said selected channel; and
comparing circuitry configured to compare the interference level of said selected channel with an interference level of the current channel, whereby said selected channel meets the criteria if the interference level of said selected channel is less than the interference level of the current channel by a predetermined amount.

22. The AP according to claim 14, further comprising:
triggering circuitry configured to trigger said determining circuitry.

23. The AP according to claim 22, wherein said triggering operates when a channel congestion condition exists.

24. The AP according to claim 23, wherein a channel congestion condition exists when
an average channel utilization of the current channel exceeds a maximum channel utilization threshold;
a packet deferral rate exceeds a maximum deferral rate; and
a transmission packet error rate exceeds a maximum packet error rate.

25. The AP according to claim 22, wherein said triggering operates when an intolerable interference level exists.

26. The AP according to claim 25, wherein an intolerable interference level exists when an external interference level exceeds a maximum interference level for a predetermined period of time.

27. An integrated circuit for changing a channel to alleviate congestion and high interference levels in a wireless local area network having an access point (AP) and at least one station, the integrated circuit comprising:
determining circuitry configured to determine a list of candidate channels;
selecting circuitry configured to select a channel from said candidate list;
evaluating circuitry configured to evaluate said selected channel against predetermined criteria selected from the group consisting of channel utilization and measured interference level;
disassociating circuitry configured to disassociate all of the stations communicating with the AP if said selected channel meets the predetermined criteria;
changing circuitry configured to change the AP to said selected channel if said selected channel meets the predetermined criteria; and
removing circuitry configured to remove said selected channel from said candidate list if said selected channel does not meet the predetermined criteria.

* * * * *

UNITED STATES PATENT AND TRADEMARK OFFICE
CERTIFICATE OF CORRECTION

PATENT NO. : 7,450,904 B2  Page 1 of 1
APPLICATION NO. : 10/942576
DATED : November 11, 2008
INVENTOR(S) : Cave et al.

It is certified that error appears in the above-identified patent and that said Letters Patent is hereby corrected as shown below:

IN THE SPECIFICATION

At column 9, delete "Equation (5)" and insert therefor
--$I(op\_chan) - I(new\_channel) > H_I^{Esc}$--.

At column 9, line 20, before the words "The hysteresis" delete "$H^{IEsc}$ dB" and insert therefor --$H_I^{Esc}$ dB--.

Signed and Sealed this

Twenty-fourth Day of March, 2009

JOHN DOLL
*Acting Director of the United States Patent and Trademark Office*